Nov. 21, 1967 — A. R. GRASIS — 3,353,320
STRUCTURAL MEMBER
Filed Nov. 10, 1965
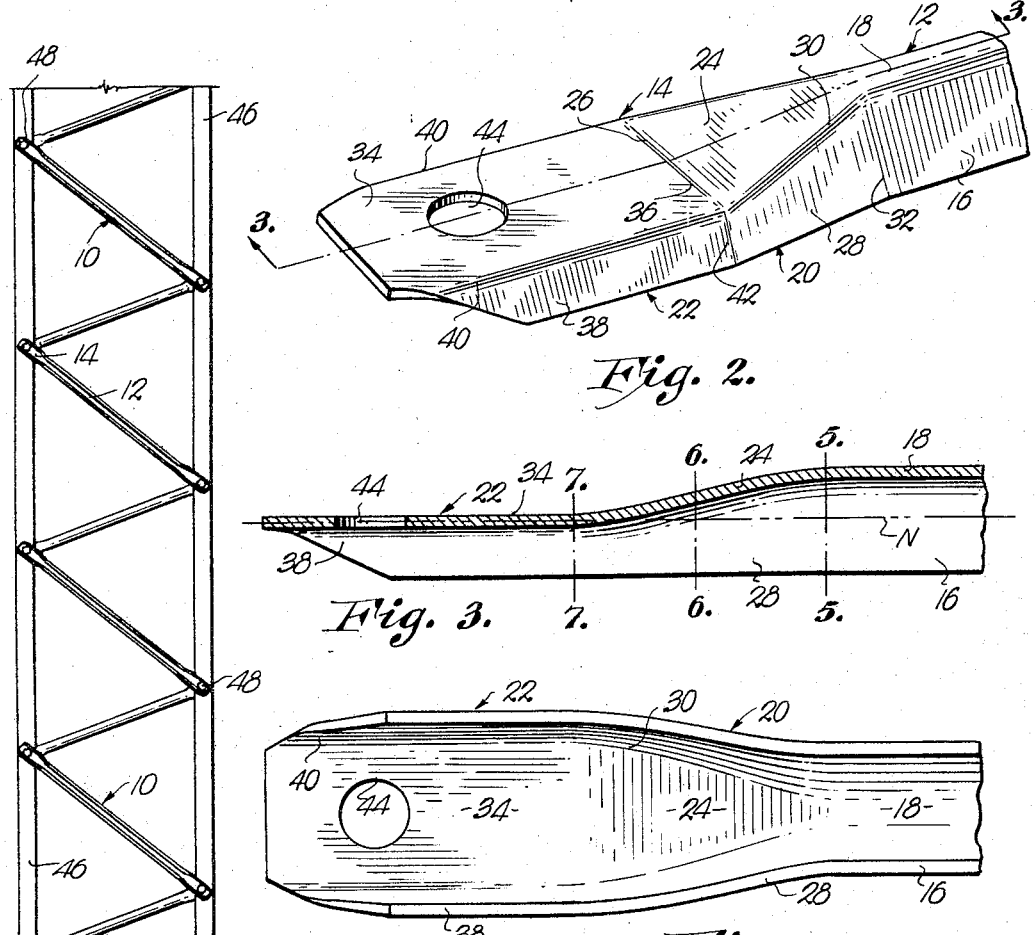
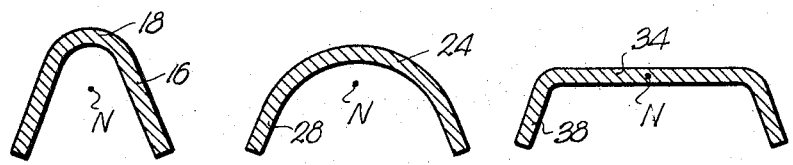
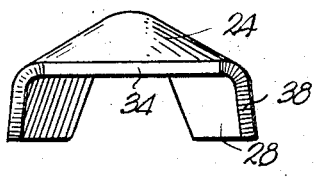
INVENTOR
August R. Grasis
BY *Hovey, Schmidt, Johnson & Hovey*
ATTORNEYS

3,353,320
STRUCTURAL MEMBER
August R. Grasis, Gladstone, Mo.
(Rte. 22, Kansas City, Mo. 64152)
Filed Nov. 10, 1965, Ser. No. 507,164
3 Claims. (Cl. 52—693)

ABSTRACT OF THE DISCLOSURE

A structural member for use as a brace, which member is straight and has a ceneral portion defined by a pair of angularly disposed, interconnected sections, the neutral axis of the member being positioned between said sections throughout the length thereof. A similar end portion is at each end of the member and each end portion includes a transition stretch which resolves the central portion into a terminal portion, each terminal portion having a flat attaching surface which is collinear with the neutral axis of the member. Each such attaching surface is provided with an opening for receiving an attaching bolt, which opening is bisected by the neutral axis of the member whereby symmetrical loading of the member is achieved.

---

This invention relates to a structural member and, more particularly, to a straight elongated bracing member which is designed to efficiently withstand a longitudinally applied force.

It is the primary object of this invention to provide a structural member adapted for efficient use as a bracing member for microwave towers and the like, the design presenting a high strength to wind area ratio. Heretofore, conventional structural members, notably angle braces, have had relatively low strength to wind area ratios, while other proposed designs, such as tubular members, are difficult to fabricate and thus their advantage of low wind resistance cannot be effectively utilized. Furthermore, a conventional angle bracing member is bolted to the tower by one leg of the angle and such an asymmetrical disposition inherently fails to exploit the strength of the other leg.

Thus, it is a very important object of this invention to provide a structural member wherein the total area of the member effectively and symmetrically withstands the applied forces and thereby eliminates uneven loading and waste of structural material. In this regard, the moment of inertia in the cross section is approximately uniform in all directions to provide the aforesaid advantages.

A more particular object of the instant invention is to provide a structural member wherein the above described advantages are obtained by providing an elongated, V-shaped member having a center of gravity or neutral axis between the legs thereof in an analogous manner to the heretofore used angle braces, and additionally, providing end portions on the member which have load-bearing surfaces, such as defined by bolt holes, in alignment with the neutral axis. Thus, when the structural member of my invention is used as a bracing member for a tower or similar structure, the wind pressure applies a load longitudinally of the member, which load is transmitted along the neutral axis for effective and even distribution thereof.

Another object of this invention is to provide a structural member having properties of the aforementioned character wherein the wind area and weight of the member may both be considerably reduced while still providing a member having a strength comparable to the heretofore commonly used bracing members. Although it is anticipated that these advantages will be particularly noteworthy in tower construction, the principles involved will undoubtedly be applicable to other structural purposes.

In the drawing:

FIGURE 1 is a fragmentary, side elevational view of a section of a tower utilizing a plurality of structural members made pursuant to the teachings of my invention;

FIG. 2 is a fragmentary, perspective view of a structural member;

FIG. 3 is a cross-sectional view taken along line 3—3 of FIG. 2;

FIG. 4 is a bottom plan view of the member;

FIG. 5 is an enlarged, cross-sectional view taken along line 5—5 of FIG. 3;

FIG. 6 is an enlarged, cross-sectional view taken along line 6—6 of FIG. 3;

FIG. 7 is an enlarged, cross-sectional view taken along line 7—7 of FIG. 3; and

FIG. 8 is an enlarged end view of the member.

The structural member of the present invention is designated by the reference numeral 10 and broadly comprises an elongated central poriton 12 and a pair of end portions 14 extending longitudinally from respective ends of central portion 12. Member 10 is normally constructed of steel, such as ASTM A–36 having a thickness of ⅛ inch, but various types of structural materials may be employed.

As best shown in the cross-sectional view of FIG. 5, central portion 12 is of a generally V-shaped configuration and includes a pair of angularly disposed sections 16 integrally joined at the juncture thereof by an arcuate apex surface 18. The neutral axis or center of gravity of central portion 12 is disposed between sections 16 and is designated by the reference letter N.

End portions 14 extend beyond respective ends of central portion 12 and each portion 14 resolves from central portion 12 into a longitudinally extending transition stretch 20 and a terminal stretch 22. Each transition stretch 20 includes an integral triangular neck 24 inclined from apex surface 18 to the neutral axis N, with the base 26 of neck 24 being disposed in perpendicular relationship to the neutral axis N. A pair of opposed, trapezodial flanges 28 depend from the side edges 30 of neck 24 and are integral with respective edges 30 of neck 24 and proximal edges 32 of central portion 12. As will be appreciated by viewing FIGS. 4 and 6, flanges 28 progressively incline outwardly from neck 24 and toward terminal stretch 22.

Each terminal stretch 22 is substantially U-shaped as shown in FIG. 7 and includes a rectangular web 34 having a transverse edge 36 thereof integrally joined with base 26 of neck 24. The longitudinal axis of web 34 is substantially collinear with the neutral axis N to define a planar load-bearing surface in web 34 substantially along the longitudinal axis thereof as will be more fully explained below.

A pair of opposed, inclined, rectangular legs 38 depend from the longitudinal edges 40 of web 34 and are integral with corresponding edges 40 of web 34 and proximal edges 42 of flanges 28. A circular opening 44 is formed in web 34 along the longitudinal axis thereof, opening 44 being bisected by the neutral axis N. It will be appreciated that the component parts of transition stretches 20 and terminal stretches 22 are symmetrically related with respect to the vertical axis of central portion 12.

It will be noted that member 10 may be stamped from a single, initially planar sheet of material to present integrally connected components throughout the member with the transition stretches 20 and terminal stretches 22 being successively resolved from central portion 12. The V-shaped cross section of central portion 12 progressively transforms into the U-shaped cross section of terminal stretch 22 through the medium of transition stretch 20. The free edges of sections 16, flanges 28 and legs 38 are substantially collinear, although this factor may vary to some degree depending on the particular angular disposition of sections 16 and the neutral axis N formed therebetween.

The anticipated principal use of structurel member 10 is that of a diagonal bracing member for use with tower structures such as partially represented by the parallel beams 46 in FIG. 1. A plurality of structural members 10 are disposed in zigzag fashion between beams 46 and are connected in end-to-end relationship by bolts 48 which are journalled through openings 44.

When wind blows against the tower, the principal stress within each structural member 10 will be directed substantially longitudinally thereof. Since the bolting surface of structural member 10 lies on the longitudinal axis of web 34 and thereby also on neutral axis N, the longitudinally applied load to member 10 will be transmitted along axis N and, therefore, will be borne symmetrically with respect to sections 16 of central portion 12. Thus, the load on member 10 is evenly distributed to eliminate the inefficient use of material experienced with conventional angle members.

Under testing conditions wherein the member is placed under longitudinal compression, the failure mode of member 10 exhibits typical slender column properties, substantially as defined by Euler's critical load formula. The member fails by sudden sectional buckling with no shortening of the member due to bending moment prior to the final failure load and, consequently, no serious secondary stress and lateral deformation are induced in the member. There is no local buckling in the member and thus the design is stable in this respect. The bolt hole deformation in the member shows that the bearing pressure thereof is distributed uniformly across the thickness, and hence the point of action is located at the middle point of web 34. There is no deformation at the transition zone prior to failure of the member and, therefore, the design thereof is suitable for the longitudinal stress loading encountered in tower structures.

It should be emphasized that the advantages of the present invention result from the positioning of the neutral axis N of central portion 12 in the same plane as the bolting surface defined along the longitudinal axis of web 34. Additionally, the moment of inertia in the cross section is approximately uniform in all directions when the angle defined by sections 16 is within the preferable range of 40 to 45 degrees, all to the end that effective, symmetrical loading is achieved. Optimum results have been obtained with an angle of 42° which provides a 25% reduction of wind area and a 29.1% reduction in weight in comparison to analogous angular members.

Having thus described the invention, what is claimed as new and desired to be secured by Letters Patent is:

1. A structural member for connecting a pair of structural elements or the like comprising:

an elongated, straight central portion having a pair of angularly disposed sections whereby to present a neutral axis positioned between said sections throughout the length thereof, the juncture of said sections defining an apex surface; and a pair of end portions extending beyond respective ends of said central portion and each resolving therefrom into longitudinally extending transition and terminal stretches, each transition stretch including an integral triangular neck inclined from said apex surface to said neutral axis, the base of the neck being substantially perpendicular to said axis, and a pair of opposed flanges integral with respective adjacent edges of said sections and said neck, said terminal stretch including a rectangular web having a transverse edge thereof integral with the base of said neck, there being a surface defined along the longitudinal axis of said web, said surface being substantially collinear with said neutral axis, and a pair of opposed legs integral with respective adjacent edges of said flanges and said web, whereby when a load is applied on said surfaces longitudinally of said member, the force of the load will be transmitted along said neutral axis.

2. A member as set forth in claim 1, wherein said web has an opening formed therein along said longitudinal axis, said neutral axis bisecting said opening.

3. A member as set forth in claim 1, wherein the angle defined by said sections is within the range of 40 to 45 degrees.

References Cited
UNITED STATES PATENTS

| | | | |
|---|---|---|---|
| 2,423,682 | 7/1947 | Castle | 52—634 |
| 2,624,080 | 1/1953 | Eichenlaub | 52—695 |
| 2,865,059 | 12/1958 | Scriven | 52—695 |
| 3,112,015 | 11/1963 | Anderson | 52—648 |
| 3,122,224 | 2/1964 | Blickensdorfer | 52—694 |
| 3,288,977 | 11/1966 | Keller | 52—694 |
| 3,314,209 | 4/1967 | Troutner | 52—693 |

FRANCIS K. ZUGEL, *Primary Examiner.*